United States Patent
Long et al.

(10) Patent No.: US 9,562,594 B2
(45) Date of Patent: Feb. 7, 2017

(54) VARIATOR MULTIPLEX VALVE SCHEME FOR A TORROIDAL TRACTION DRIVE TRANSMISSION

(71) Applicant: Allison Transmission, Inc., Indianapolis, IN (US)

(72) Inventors: Charles F. Long, Pittsboro, IN (US); Darren J. Weber, Indianapolis, IN (US); John W. E. Fuller, Preston (GB)

(73) Assignee: Allison Transmission, Inc., Indianapolis, IN (US)

( * ) Notice: Subject to any disclaimer, the term of this patent is extended or adjusted under 35 U.S.C. 154(b) by 240 days.

(21) Appl. No.: 14/275,428

(22) Filed: May 12, 2014

(65) Prior Publication Data
US 2014/0249725 A1    Sep. 4, 2014

Related U.S. Application Data

(63) Continuation of application No. 13/325,355, filed on Dec. 14, 2011, now Pat. No. 8,721,494.
(Continued)

(51) Int. Cl.
*F16H 15/40*     (2006.01)
*F16H 61/02*     (2006.01)
(Continued)

(52) U.S. Cl.
CPC .......... *F16H 15/40* (2013.01); *F16H 61/0206* (2013.01); *F16H 61/664* (2013.01);
(Continued)

(58) Field of Classification Search
CPC ............ F16H 61/664; F16H 2061/1232; F16H 2061/6601; F16H 37/086; F16H 61/0276; F16H 15/38
See application file for complete search history.

(56) References Cited

U.S. PATENT DOCUMENTS

| | | |
|---|---|---|
| 4,838,126 A | 6/1989 | Wilfinger et al. |
| 4,922,788 A | 5/1990 | Greenwood |

(Continued)

FOREIGN PATENT DOCUMENTS

| | | |
|---|---|---|
| CN | 101042189 A | 9/2007 |
| CN | 101828055 A | 9/2010 |

(Continued)

OTHER PUBLICATIONS

Search Report and Written Opinion of the State Intellectual Property Office of the People's Republic of China for Application No. 2011800675497, dated Nov. 25, 2014, 13 pages.
(Continued)

*Primary Examiner* — David M Fenstermacher
(74) *Attorney, Agent, or Firm* — Barnes & Thornburg LLP

(57) ABSTRACT

An apparatus and method are disclosed for controlling fluid flow to a variator which responsive to separate high and low pressure fluids to control an output torque thereof. A first trim valve may be responsive to a first control signal to supply a first fluid at a fluid outlet thereof. A second trim valve may be responsive to a second control signal to supply a second fluid at a fluid outlet thereof. A variator switching sub-system may controllably supply the high pressure fluid and the low pressure fluid to the variator. A multiplex valve may be fluidly coupled to the outlets of the first and second trim valves, and may supply the first fluid as the high pressure fluid to the variator switching sub-system during at least one predefined operating condition and may otherwise supply the second fluid as the high pressure fluid to the variator switching sub-system.

19 Claims, 5 Drawing Sheets

Related U.S. Application Data

(60) Provisional application No. 61/423,297, filed on Dec. 15, 2010.

(51) Int. Cl.
*F16H 61/664* (2006.01)
*F16H 61/12* (2010.01)

(52) U.S. Cl.
CPC ..... *F16H 61/6648* (2013.01); *F16H 61/0276* (2013.01); *F16H 2061/1232* (2013.01); *Y10T 477/6203* (2015.01); *Y10T 477/6425* (2015.01)

(56) References Cited

U.S. PATENT DOCUMENTS

| | | | |
|---|---|---|---|
| 4,984,505 A | 1/1991 | Leeson et al. | |
| 5,090,951 A | 2/1992 | Greenwood | |
| 5,217,418 A | 6/1993 | Fellows et al. | |
| 5,232,414 A | 8/1993 | Fellows et al. | |
| 5,242,337 A | 9/1993 | Greenwood | |
| 5,263,907 A | 11/1993 | Fellows | |
| 5,308,297 A | 5/1994 | Greenwood | |
| 5,308,298 A | 5/1994 | Lambert | |
| 5,316,526 A | 5/1994 | Fellows | |
| 5,338,268 A | 8/1994 | Greenwood | |
| 5,395,292 A | 3/1995 | Fellows et al. | |
| 5,401,221 A | 3/1995 | Fellows et al. | |
| 5,423,727 A | 6/1995 | Fellows | |
| 5,453,061 A | 9/1995 | Fellows | |
| 5,521,819 A | 5/1996 | Greenwood | |
| 5,564,993 A | 10/1996 | Robinson | |
| 5,564,998 A | 10/1996 | Fellows | |
| 5,643,121 A | 7/1997 | Greenwood et al. | |
| 5,667,456 A | 9/1997 | Fellows | |
| 5,766,105 A | 6/1998 | Fellows et al. | |
| 5,820,508 A | 10/1998 | Konig et al. | |
| 5,820,513 A | 10/1998 | Greenwood | |
| 5,895,337 A | 4/1999 | Fellows et al. | |
| 5,938,557 A | 8/1999 | Greenwood | |
| 5,971,885 A | 10/1999 | Greenwood et al. | |
| 6,030,310 A | 2/2000 | Greenwood et al. | |
| 6,066,067 A | 5/2000 | Greenwood | |
| 6,071,209 A | 6/2000 | Greenwood | |
| 6,273,839 B1 | 8/2001 | Dutson | |
| 6,292,732 B1 | 9/2001 | Steinmetz et al. | |
| 6,306,060 B1 | 10/2001 | Dutson et al. | |
| 6,312,356 B1 | 11/2001 | Greenwood | |
| 6,364,811 B1 | 4/2002 | Hubbard et al. | |
| 6,464,614 B2 | 10/2002 | Dutson | |
| 6,626,793 B1 | 9/2003 | Greenwood | |
| 6,666,791 B1 | 12/2003 | Greenwood | |
| 6,979,276 B2 | 12/2005 | Murray | |
| 7,018,320 B2 | 3/2006 | Robinson et al. | |
| 7,056,261 B2 | 6/2006 | Fuller | |
| 7,160,226 B2 | 1/2007 | Fuller | |
| 7,204,783 B2* | 4/2007 | Fukuyama | F16H 61/6648 476/10 |
| 7,278,951 B2* | 10/2007 | Fuller | F16H 61/0021 476/10 |
| 7,318,786 B2* | 1/2008 | Greenwood | F16H 61/6649 476/10 |
| 7,395,837 B2 | 7/2008 | Foster et al. | |
| 7,407,459 B2 | 8/2008 | Greenwood et al. | |
| 7,491,149 B2 | 2/2009 | Greenwood et al. | |
| 7,530,916 B2 | 5/2009 | Greenwood | |
| 7,563,194 B2 | 7/2009 | Murray | |
| 7,614,973 B2 | 11/2009 | Parthuisot et al. | |
| 7,625,309 B2* | 12/2009 | Fuller | F16H 37/086 476/10 |
| 7,632,208 B2 | 12/2009 | Greenwood et al. | |
| 7,637,841 B2 | 12/2009 | Dutson | |
| 7,727,110 B2* | 6/2010 | Miller | B62D 5/0409 476/36 |
| 7,951,041 B2 | 5/2011 | Dutson | |
| 7,955,210 B2 | 6/2011 | Greenwood et al. | |
| 8,282,525 B2* | 10/2012 | Oliver | F16H 63/065 476/10 |
| 8,401,752 B2* | 3/2013 | Long | F16H 61/0276 477/39 |
| 8,424,373 B2* | 4/2013 | Long | G01M 13/02 73/115.02 |
| 8,578,802 B2* | 11/2013 | Long | F16D 48/02 475/215 |
| 8,583,334 B2* | 11/2013 | Martin | F16D 48/066 476/67 |
| 8,589,043 B2* | 11/2013 | Long | F16H 61/0276 477/39 |
| 8,721,494 B2 | 5/2014 | Long et al. | |
| 8,727,942 B2 | 5/2014 | Long et al. | |
| 2001/0041642 A1 | 11/2001 | Miyata | |
| 2004/0038773 A1 | 2/2004 | Robinson et al. | |
| 2005/0043138 A1 | 2/2005 | Fuller | |
| 2005/0143216 A1 | 6/2005 | Greenwood et al. | |
| 2005/0176547 A1 | 8/2005 | DeFreitas | |
| 2005/0211295 A1 | 9/2005 | Long et al. | |
| 2006/0142110 A1 | 6/2006 | Greenwood et al. | |
| 2006/0160656 A1 | 7/2006 | Dutson | |
| 2006/0184303 A1 | 8/2006 | Long et al. | |
| 2006/0201766 A1 | 9/2006 | Fuller | |
| 2007/0072736 A1 | 3/2007 | DeFreitas et al. | |
| 2007/0112495 A1 | 5/2007 | Murray | |
| 2007/0142163 A1 | 6/2007 | Murray | |
| 2007/0220879 A1 | 9/2007 | Lochocki, Jr. et al. | |
| 2007/0275817 A1 | 11/2007 | Newall | |
| 2008/0085801 A1 | 4/2008 | Sedoni et al. | |
| 2008/0146399 A1 | 6/2008 | Oliver et al. | |
| 2008/0153659 A1 | 6/2008 | Greenwood | |
| 2008/0176709 A1 | 7/2008 | Wu et al. | |
| 2008/0269001 A1 | 10/2008 | Greenwood et al. | |
| 2009/0048054 A1 | 2/2009 | Tsuchiya et al. | |
| 2009/0062065 A1 | 3/2009 | Field et al. | |
| 2009/0075772 A1 | 3/2009 | Ellis et al. | |
| 2009/0203486 A1 | 8/2009 | Murray | |
| 2009/0253552 A1 | 10/2009 | Foster | |
| 2009/0305840 A1 | 12/2009 | Oliver | |
| 2011/0030493 A1 | 2/2011 | Koenig et al. | |
| 2011/0140017 A1 | 6/2011 | Long et al. | |
| 2011/0144872 A1 | 6/2011 | Long et al. | |
| 2011/0144925 A1 | 6/2011 | Long et al. | |
| 2011/0152031 A1 | 6/2011 | Schoolcraft | |
| 2012/0202642 A1 | 8/2012 | Long et al. | |

FOREIGN PATENT DOCUMENTS

| | | |
|---|---|---|
| GB | 2361510 | 10/2001 |
| GB | 2368618 | 5/2002 |
| GB | 2384531 | 7/2003 |
| GB | 2397630 | 7/2004 |
| GB | 2410302 | 7/2005 |
| GB | 2418235 | 3/2006 |
| GB | 2438412 | 11/2007 |
| GB | 2440746 | 2/2008 |
| GB | 2455030 | 6/2009 |
| GB | 2459857 | 11/2009 |
| GB | 2460237 | 11/2009 |
| GB | 2470717 | 12/2010 |
| GB | 2474870 | 5/2011 |
| JP | 2001041309 A | 2/2001 |
| WO | 9740292 | 10/1997 |

OTHER PUBLICATIONS

Torotrak Full toroidal variator (http://www.torotrak.com/IVT/works/variator.htm) 5 pages (accessed Sep. 24, 2009).
International Search Report and the Written Opinion for International Application No. PCT/US11/64865, dated Apr. 19, 2012 (8 pages).
Patent Examination Report No. 1 from the Australian Government for Application No. 2011343830, dated Oct. 15, 2015, 3 pages.
International Preliminary Report on Patentability for Application No. PCT/US2011/064865, issued Jun. 18, 2013, 7 pages.

(56) References Cited

OTHER PUBLICATIONS

European Search Report for Application No. 11848537.4, dated May 23, 2016, 5 pages.

* cited by examiner

VARIATOR MULTIPLEX VALVE SCHEME FOR A TORROIDAL TRACTION DRIVE TRANSMISSION

CROSS-REFERENCE TO RELATED APPLICATIONS

This application is a continuation application of U.S. patent application Ser. No. 13/325,355 entitled "VARIATOR MULTIPLEX VALVE SCHEME FOR A TORROIDAL TRACTION DRIVE TRANSMISSION," which was filed on Dec. 14, 2011, and which claims priority under 35 U.S.C. §119(e) to U.S. Provisional Application Ser. No. 61/423,297, filed Dec. 15, 2010, each of which is incorporated herein by reference.

TECHNICAL FIELD

The present invention relates generally to torroidal traction drive automatic transmissions, and more specifically to systems and methods for controlling fluid flow to a variator during various transmission operating conditions.

BACKGROUND

Torroidal traction drive automatic transmissions may typically include a variator and one or more gear sets. Within each gear set, the variator may generally control a direction, e.g., positive or negative, and magnitude of torque transferred by a power plant to one or more loads. Structures and techniques for controlling fluid flow to the variator during various operating conditions of the transmission must therefore be designed and implemented.

SUMMARY

The present application discloses one or more of the features recited in the appended claims and/or the following features which alone or in any combination, may comprise patentable subject matter.

An apparatus for controlling fluid flow to a variator in an automatic transmission. The variator may be responsive to separate high and low pressure fluids to control an output torque of the variator. The apparatus may comprise a first trim valve responsive to a first control signal to supply a first fluid at a fluid outlet thereof, a second trim valve responsive to a second control signal to supply a second fluid at a fluid outlet thereof, a variator switching sub-system controllably supplying the high pressure fluid and the low pressure fluid to the variator, and a multiplex valve fluidly coupled to the outlets of the first and second trim valves, the multiplex valve supplying the first fluid supplied by the first trim valve as the high pressure fluid to the variator switching sub-system during at least one predefined operating condition of the automatic transmission and otherwise supplying the second fluid supplied by the second trim valve as the high pressure fluid to the variator switching sub-system.

The apparatus may further comprise a control circuit including a memory having instructions stored therein executable by the control circuit to produce the first and second control signals. The at least one predefined operating condition may comprise at least one of a fault condition associated with the automatic transmission and a cold start condition.

The multiplex valve may comprise a spool having a stroked operating state and a destroked operating state. The multiplex valve may supply the first fluid as the high pressure fluid to the variator switching sub-system in one of the stroked operating state and the destroked operating state, and the multiplex valve may supply the second fluid as the high pressure fluid to the variator switching sub-system in the other one of the stroked operating state and the destroked operating state. The apparatus may further comprise a control valve responsive to a third control signal to control the multiplex valve to the stroked operating state and to a fourth control signal to control the multiplex valve to the destroked operating state. The apparatus may further comprise a control circuit including a memory having instructions stored therein executable by the control circuit to produce one of the third and fourth control signals to control the control valve to the other one of the stroked operating state and the destroked operating state during the at least one predefined operating condition, and the at least one predefined operating condition may comprise at least one of a fault condition associated with the automatic transmission and a cold start condition.

The apparatus may further comprise a regulator valve fluidly coupled by the multiplex valve to a reference pressure during the at least one predefined operating condition. The regulator valve may also be fluidly coupled to a main fluid passageway that is further fluidly connected to a fluid inlet of the first trim valve. The regulator valve may be responsive to the reference pressure to regulate fluid pressure in the main fluid passageway to a fixed pressure main fluid during the at least one predefined operating condition. The fluid outlet of the first trim valve may be fluidly coupled by the multiplex valve to the variator switching sub-system during the at least one predefined operating condition. The first trim valve may be responsive to the first control signal to supply the first fluid as the high pressure fluid based on the fixed pressure main fluid during the at least one predefined operating condition. The main fluid passageway may be further fluidly coupled by the regulator valve to a fluid inlet of the second trim valve. The second trim valve may be responsive to the second control signal to supply the second fluid to the multiplex valve based on the fixed pressure main fluid during the at least one predefined operating condition. The multiplex valve may block the fixed pressure second fluid from the variator switching sub-system during the at least one predefined operating condition. The variator may have at least one roller between a first torroidal disk coupled to an input of the automatic transmission and a second torroidal disk coupled to an output of the automatic transmission. The variator may be fluidly coupled to an endload fluid passageway. The endload fluid passageway may define therein an endload pressure corresponding to a pressure load on the first and second torroidal disks required to keep the first and second torroidal disks from slipping. The endload fluid passageway may be fluidly coupled to the multiplex valve. The multiplex valve may fluidly couple the endload fluid passageway to the main fluid passageway to thereby supply the fixed pressure main fluid to the endload fluid passageway during the at least one predefined operating condition.

The apparatus may further comprise a control circuit including a memory having instructions stored therein executable by the control circuit to produce the other one of the third and fourth control signals to control the control valve to the one of the stroked operating state and the destroked operating state during operating conditions other than the at least one predefined operating condition.

The apparatus may further comprise a regulator valve fluidly coupled by the multiplex valve to the fluid outlet of the first trim valve during operating conditions other than the at least one predefined operating condition. The regulator valve may also be fluidly coupled to a main fluid passageway that is further fluidly connected to a fluid inlet of the first trim valve. The first trim valve may be responsive to the first control signal to supply the first fluid to the fluid outlet of the first trim valve based on pressure of fluid in the main fluid passageway during the operating conditions other than the at least one predefined operating condition. The regulator valve may be responsive to the first fluid to regulate fluid pressure in the main fluid passageway during the operating conditions other than the at least one predefined operating condition. The main fluid passageway may be further fluidly coupled by the regulator valve to a fluid inlet of the second trim valve. The fluid outlet of the second trim valve may be fluidly coupled by the multiplex valve to the variator switching sub-system during the operating conditions other than the at least one predefined operating condition. The second trim valve may be responsive to the second control signal to supply the second fluid as the high pressure fluid based on fluid pressure in the main fluid passageway during the conditions other than the at least one predefined operating condition. The variator may have at least one roller between a first torroidal disk coupled to an input of the automatic transmission and a second torroidal disk coupled to an output of the automatic transmission. The variator may be fluidly coupled to an endload fluid passageway. The endload fluid passageway may define therein an endload pressure corresponding to a pressure load on the first and second torroidal disks required to keep the first and second torroidal disks from slipping. The endload fluid passageway may be fluidly coupled to the multiplex valve. The multiplex valve may fluidly couple the endload fluid passageway to a variable pressure fluid passageway of the variator such that fluid pressure in the endload fluid passageway is variably controlled by the variator during the operating conditions other than the at least one predefined operating condition.

A method for controlling fluid flow to a variator in an automatic transmission, wherein the variator is responsive to separate high and low pressure fluids supplied by a variator switching sub-system to control an output torque of the variator, may comprise supplying a first fluid supplied by a first trim valve as the high pressure fluid to the variator switching sub-system during at least one predefined operating condition of the automatic transmission, and supplying a second fluid supplied by a second trim valve separate from the first trim valve as the high pressure fluid to the variator switching sub-system during operating conditions other than the at least one predefined operating condition.

The first fluid supplied by the first trim valve to the variator switching sub-system as the high pressure fluid during the at least one predefined operating condition of the automatic transmission may be a variable pressure fluid. The variable pressure first fluid supplied by the first trim valve to the variator switching sub-system as the high pressure fluid during the at least one predefined operating condition may be derived from a main fluid, and the method may further comprise regulating pressure of the main fluid to a fixed pressure based on a fixed reference pressure during the at least one predefined operating condition.

The fixed reference pressure may be ambient pressure.

The second fluid supplied by the second trim valve to the variator switching sub-system as the high pressure fluid during the operating conditions other than the at least one predefined operating condition of the automatic transmission may be a variable pressure fluid. The variable pressure second fluid supplied by the second trim valve to the variator switching sub-system as the high pressure fluid during the operating conditions other than the at least one predefined operating condition may be derived from a main fluid, and wherein the method may further comprise modulating fluid pressure of the main fluid based on the first fluid supplied by the first trim valve during the operating condition other than the at least one predefined operating condition.

The variator may have at least one roller between a first torroidal disk coupled to an input of the automatic transmission and a second torroidal disk coupled to an output of the automatic transmission, and the variator may have an endload fluid passageway defining therein an endload pressure corresponding to a pressure load on the first and second torroidal disks required to keep the first and second torroidal disks from slipping. The method may further comprise supplying a fixed pressure fluid to the endload fluid passageway during the at least one predefined operating condition. The method may further comprise fluidly coupling the endload fluid passageway to a variable pressure fluid passageway of the variator during the operating conditions other than the at least one predefined operating condition such that fluid pressure in the endload fluid passageway is variably controlled by the variator during the operating conditions other than the at least one predefined operating condition.

The at least one predefined operating condition may comprise at least one of a fault condition associated with the automatic transmission and a cold start condition.

Additional features and advantages of the invention will become apparent to those skilled in the art upon consideration of the following detailed description of illustrated embodiments exemplifying the best mode of carrying out the invention as presently perceived.

DESCRIPTION OF THE DRAWINGS

The systems and methods described herein are illustrated by way of example and not by way of limitation in the accompanying figures. For simplicity and clarity of illustration, elements illustrated in the FIGS. are not necessarily drawn to scale. For example, the dimensions of some elements may be exaggerated relative to other elements for clarity. Further, where considered appropriate, reference labels have been repeated among the FIGS. to indicate corresponding or analogous elements.

DETAILED DESCRIPTION

Figure 1:
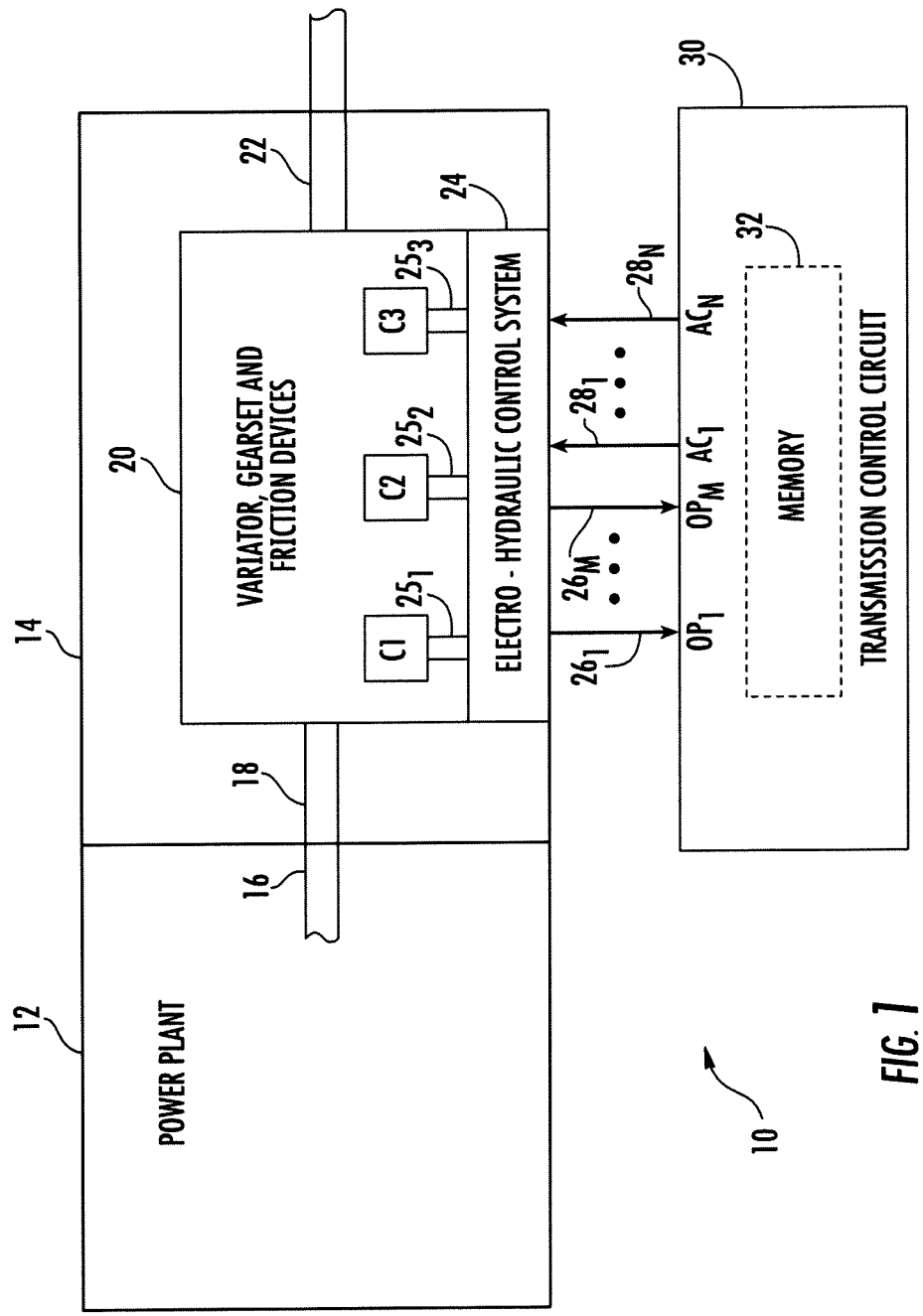
FIG. 1 is a block diagram of one illustrative embodiment of a system for controlling operation of a toroidal traction drive automatic transmission.

For the purposes of promoting an understanding of the principles of the invention, reference will now be made to a number of illustrative embodiments shown in the attached drawings and specific language will be used to describe the same.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Referring now to FIG. 1, a block diagram is shown of one illustrative embodiment of a system 10 for controlling operation of a toroidal traction drive automatic transmission 14. In the illustrated embodiment, a power plant or energy center 12 is coupled to an automatic transmission 14 such that a rotatable output shaft 16 of the power plant 12 is coupled to a rotatable input shaft 18 of the transmission 14 in a conventional manner. The input shaft 18 is coupled, in the illustrated embodiment, to a combination variator and gear set 20 that further includes a plurality of selectively engageable friction devices, e.g., one or more conventional, selectively engageable clutches or the like, and an output of the combination variator and gear set 20 is coupled to a rotatable output shaft 22. The combination variator and gear set 20 is illustratively controlled by an electro-hydraulic control system 24, some of the details of which will be described in greater detail hereinafter.

The power plant 12 is generally an apparatus that produces rotational drive power at the output shaft 16. Examples of the power plant 12 include, but should not be limited to, one or any combination of a one or more engines, such as an internal combustion engine of the spark ignited, compression ignition or other variety, a steam engine, or type of engine that produces mechanical energy from one or more other fuel sources, one or more electrical generators, and the like.

Figure 2A:
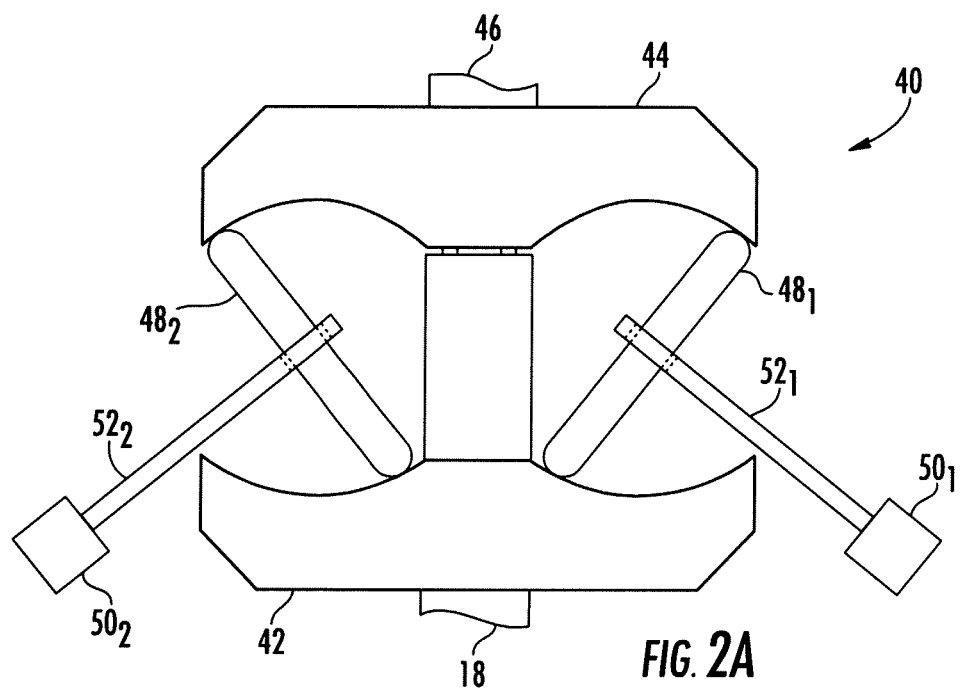
FIG. 2A is a diagram illustrating operation of one illustrative embodiment of a variator that forms part of the toroidal traction drive automatic transmission illustrated in FIG. 1.
Figure 2B:
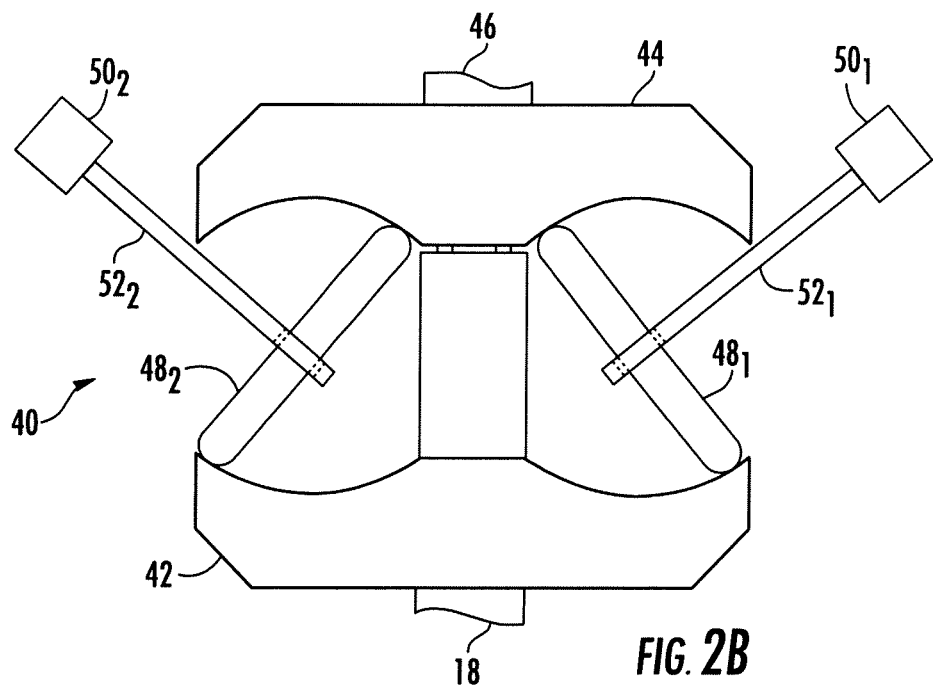
FIG. 2B is a diagram further illustrating operation of the variator of FIG. 2A.

The combination variator and gear set 20 illustratively includes a conventional full-toroidal, traction-drive variator that is coupled to a conventional gear set. Referring to FIGS. 2A and 2B, one illustrative embodiment of some of the structural features of such a full-toroidal, traction-drive variator 40 is shown. In the illustrated embodiment, the variator 40 includes a pair of opposing, toroidal-shaped disks 42 and 44 that rotate independently of each other. For example, the disk 42 is illustratively directly connected to the input shaft 18 of the transmission 14 such that the disk 42 is directly rotatably driven by the power plant 12. Alternatively, the disk 42 may be connected to the input shaft 18 of the transmission through one or more structures, e.g., one or more gear sets or other structures. For purposes of this disclosure, the term "coupled" used to described the relationship between the disk 42 and the input shaft 18 of the transmission is defined as either a direct connection, i.e., engagement, between the disk 42 and the input shaft 18 of the transmission 14 or an indirect connection between the disk 42 and the input shaft 18 of the transmission 14 through one or more structures interposed between the disk 42 and the input shaft 18 of the transmission 14. Illustratively, the disk 44 is rigidly coupled to an output shaft 46 of the variator 40, and is rotatably coupled to the shaft 18 such that the disk 44 rotates freely about the shaft 18. The output shaft 46 of the variator 40 is coupled directly, or indirectly through one or more transmission gears, to the output shaft 22 of the transmission 14 such that output shaft 46 of the variator 40 drives one or more wheels of a vehicle (not shown) carrying the power plant 12 and transmission 14.

A number of rollers 48 are illustratively positioned between opposing inner, arcuate-shaped surfaces, e.g., concave surfaces, of the disks 42 and 44, and a traction fluid (not shown) is disposed between the rolling surface of each such roller 48 and the inner surfaces of the disks 42 and 44. In the illustrated embodiment, the rolling surfaces of the various rollers 48 therefore do not contact, in a structural sense, the inner surface of either disk 42, 44; rather torque is transmitted by the various rollers 48 between the two disks 42, 44 via the traction fluid. It is because torque is transferred between the two disks 42, 44 via the traction fluid and not via structural contact between the rolling surfaces of the rollers 48 and the arcuate inner surfaces of the disks 42, 44 that the variator is referred to as a traction-drive apparatus.

In the embodiment illustrated in FIGS. 2A and 2B, two such rollers $48_1$ and $48_2$ are shown operatively positioned between the opposing inner surfaces of the two disks 42, 44. A roller actuator $50_1$, e.g., in the form of a conventional hydraulically actuated piston, is coupled to the roller $48_1$ via a bracket $52_1$, and another roller actuator $50_2$, e.g., in the form of another conventional hydraulically actuated piston, is coupled to the roller $48_2$ via a bracket $52_2$. It will be understood that the brackets $52_1$ and $52_2$ do not represent rotatable shafts about which the rollers $48_1$ and $48_2$ may be rotatably driven. Rather, the brackets $52_1$ and $52_2$ represent structures about which the rollers $48_1$ and $48_2$ rotate. In one actual implementation, for example, the brackets $52_1$ and $52_2$ are configured to attach to the central hub of the rollers $48_1$ and $48_2$ on either side thereof such that the brackets $52_1$ and $52_2$ and actuators $50_1$ and $50_2$ would extend generally perpendicular to the page illustrating FIGS. 2A and 2B.

The hydraulically controlled actuators $50_1$ and $50_2$ are each illustratively controllable by selectively controlling a high-side hydraulic pressure applied to one side of the actuators $50_1$ and $50_2$ and a low-side hydraulic pressure applied to the opposite side of the actuators $50_1$ and $50_2$. Traction force generated by the net hydraulic pressure, i.e., the difference between the applied high and low side hydraulic pressures, is transmitted by the rollers $48_1$ and $48_2$ to the two disks 42, 44 via the traction fluid, and this applied traction force defines the torque transmitted between the two disks 42, 44. Thus, a direct relationship exists between the net hydraulic pressure applied to the actuators $50_1$ and $50_2$ and the magnitude of the torque transmitted between the two disks 42, 44. Each roller $48_1$ and $48_2$ moves and precesses to the location and tilt angle relative to the disks 42, 44 required to transmit the torque to the disks 42, 44 defined by the net hydraulic pressure applied to the hydraulic actuators $50_1$ and $50_2$. A difference in the magnitude of the net hydraulic pressure applied to the actuators $50_1$ and $50_2$ changes the torque transmitted to the output shaft 46. The direction of the torque applied by the rollers $48_1$ and $48_2$ to the two disks 42, 44, is determined by the relative magnitudes of the high and low side pressures applied to the actuators $50_1$ and $50_2$. In one illustrative embodiment, for example, the rollers $48_1$ and $48_2$ apply a positive torque to the two disks 42, 44 if the high side hydraulic pressure is greater than the low side hydraulic pressure, and the rollers $48_1$ and $48_2$ conversely apply a negative torque to the two disks if the low side pressure is greater than the high side hydraulic pressure. In alternative embodiments, the rollers $48_1$ and $48_2$ may apply a positive torque to the two disks 42, 44 if the low side hydraulic pressure is greater than the high side hydraulic pressure, and the rollers $48_1$ and $48_2$ may conversely apply a negative torque to the two disks if the high side pressure is greater than the low side hydraulic pressure. In any case, the rollers $48_1$ and $48_2$ are free-castoring, and are responsive to the actuators $50_1$ and $50_2$ to seek a position that provides the correct ratio match of engine and drive train speeds based on input energy equaling output energy.

In one illustrative implementation, the variator 40 includes two sets or pairs of disks 42 and 44, with the pairs of the disks 42 rigidly coupled to each other and with the pairs of the disks 44 also rigidly coupled to each other, such that the embodiment illustrated in FIGS. 2A and 2B represents one-half of such an implementation. In this illustrative implementation, three rollers are positioned between each opposing set of disks 42, 44 for a total of six rollers $48_1$-$48_6$ and six corresponding hydraulically controlled actuators $50_1$-$50_6$. It will be understood, however, that this particular implementation of the variator 40 is shown and described only by way of example, and that other embodiments of the variator 40 that include more or fewer pairs of disks 42, 44, that include more or fewer rollers 48 and hydraulically controlled actuators 50, and/or that are configured to be only partially toroidal in shape, may alternatively be used. It will further be understood that while the operation of the variator 40 is illustrated and described herein as being generally hydraulically controlled, this disclosure contemplates embodiments in which operation of the variator 40 is controlled via purely electronic or electro-mechanical structures.

Referring again to FIG. 1, the gear set within the combination variator and gear set 20 illustratively includes one or more conventional planetary gear set(s) and/or other gear set(s) that define(s) at least two automatically selectable gear ratios and that is coupled to, or integrated with, the variator, e.g., the variator 40 illustrated and described with respect to FIG. 2. The combination variator and gear set 20 further illustratively includes a number of conventional friction devices, e.g., clutches, which may be selectively controlled to thereby control shifting of the transmission 14 between the two or more gear ratios. In alternate embodiments, the gear set may include more than one planetary gear set, one or more planetary gear sets in combination with one or more other conventional gear sets, or exclusively one or more non-planetary gear sets.

In the example embodiment illustrated in FIG. 1, the transmission 14 includes three friction devices, e.g., in the form of three conventional clutches C1, C2 and C3. In this embodiment, each clutch C1, C2 and C3 is operated in a conventional manner, e.g., via fluid pressure, under the control of the electro-hydraulic control system 24. In this regard, a fluid path $25_1$ is fluidly coupled between the electro-hydraulic control system 24 and the clutch C1, a fluid path $25_2$ is fluidly coupled between the electro-hydraulic control system 24 and the clutch C2, and a fluid path $25_3$ is fluidly coupled between the electro-hydraulic control system 24 and the clutch C3. The electro-hydraulic control system 24 is operable to control operation of the clutches C1-C3 by controlling fluid pressure within the fluid paths $25_1$-$25_3$ respectively.

The gear set and the clutches C1, C2 and C3 are illustratively arranged to provide four separate modes of operation of the transmission 14, and the various operating modes of the transmission 14 are selectively controlled by the operation of the clutches C1, C2 and C3. In a first operating mode, M1, for example, the clutch C1 is applied, e.g., engaged, while the clutches C2 and C3 are released, e.g., disengaged, and in this mode forward or reverse launch can be accomplished, and the vehicle carrying the transmission 14 can be operated at vehicle speeds up to about 10 miles per hour. In a second operating mode, M2, as another example, the clutch C2 is engaged while the clutches C1 and C3 are disengaged, and in this mode the vehicle can be operated at vehicle speeds in the range of about 10-30 miles per hour. In a third operating mode, M3, as yet another example, the clutch C3 is engaged while the clutches C1 and C2 are disengaged, and in this mode the vehicle can be operated at vehicle speeds greater than about 30 miles per hour. In a fourth mode, M0, as a final example, the clutches C1, C2 and C3 are all disengaged, and in this mode the transmission 14 is in neutral. Within each operating mode, torque applied to the output shaft 22 of the transmission 14 is controlled by the variator, e.g., the variator 40. In the transitional states between the various operating modes M1, M2 and M3, the variator torque is illustratively reversed to assist transitions from one operating mode to the next.

The system 10 further includes a transmission control circuit 30 that controls and manages the overall operation of the transmission 14. The transmission control circuit 30 includes a number, M, of operating parameter inputs, $OP_1$-$OP_M$, that are electrically connected to corresponding operating parameter sensors included within the electro-hydraulic control system 24 via corresponding signal paths $26_1$-$26_M$, wherein M may be any positive integer. The one or more operating parameter sensors included within the electro-hydraulic control system 24, examples of which will be described hereinafter, produce corresponding operating parameter signals on the signal paths $26_1$-$26_M$, which are received by the transmission control circuit 30. The transmission 14 further includes a number, N, of electrically controllable actuators included within the electro-hydraulic control system 24 that are each electrically connected to different one of a corresponding number of actuator control outputs, $AC_1$-$AC_N$ of the transmission control circuit 30 via corresponding signal paths $28_1$-$28_N$, wherein N may be any positive integer. The one or more electrically controllable actuators included within the electro-hydraulic control system 24, examples of which will be described hereinafter, are responsive to actuator control signals produced by the transmission control circuit 30 on the corresponding signal paths $28_1$-$28_N$ to control various operational features of the transmission 14.

Illustratively, the transmission control circuit 30 is microprocessor-based, and includes a memory unit 32 having instructions stored therein that are executable by the control circuit 30 to control operation of the transmission 14 generally, and more specifically to control operation of the electro-hydraulic control system 24. It will be understood, however, that this disclosure contemplates other embodiments in which the transmission control circuit 30 is not microprocessor-based, but is configured to control operation of the transmission 14 generally and operation of the electro-hydraulic system 24 more specifically, based on one or more sets of hardwired instructions and/or software instructions stored in the memory unit 32.

Figure 3:
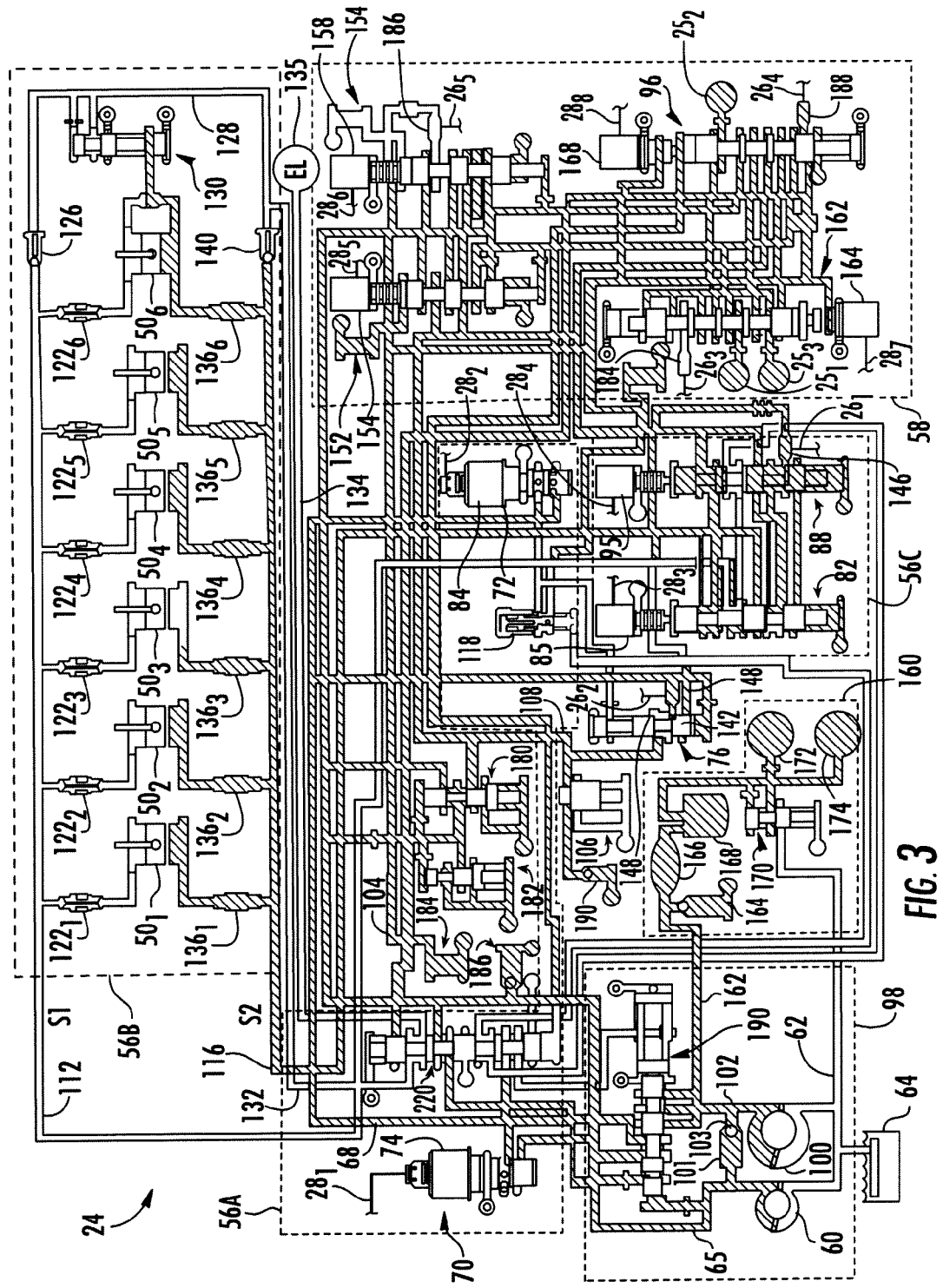
FIG. 3 is a schematic diagram of one illustrative embodiment of the electro-hydraulic control system that forms part of the toroidal traction drive automatic transmission illustrated in FIG. 1.

Referring now to FIG. 3, a schematic diagram is shown of one illustrative embodiment of the electro-hydraulic control system 24 of FIG. 1. In the illustrated embodiment, the electro-hydraulic control system 24 is roughly divided into separate control sections; a variator control section 56 comprising a variator trim control sub-system 56A, a variator actuator sub-system 56B and a variator switching sub-system 56C, a clutch control section 58, and a clutch and variator pressure control section 98.

Referring specifically to the clutch and variator pressure control section 98, a conventional fluid pump 60 is configured to supply transmission fluid, e.g., conventional transmission oil, to the variator trim control section 56A, the variator switching and fault detection section 56C and to the clutch control section 58 from a source 64 of transmission fluid, e.g., a conventional transmission sump 64. In one illustrative embodiment, the fluid pump 60 is a conventional positive-displacement pump that is driven by the drive shaft 16 of the engine 12 via the input shaft 18 of the transmission 14, and is sized and configured to supply pressurized fluid from the sump 64 to a number of friction control devices, e.g., clutches, and to the variator. In the illustrated embodiment, a fluid inlet of the fluid pump 60 is fluidly coupled to the sump 64 via a fluid passageway 62. A fluid outlet of the pump 60 is fluidly coupled via a clutch main fluid passageway 65 to a fluid port and end of a dual pump pressure regulator valve 190, to a fluid outlet of a check ball valve 101, to a fluid inlet of a variator trim valve 70, to a fluid port of a variator pressure multiplex valve 220, to a control main fluid passageway 104 via a conventional flow reducer, to a fluid port of a conventional main pressure regulator valve 180 and a fluid inlet of a main clutch pressure relief valve 186, and to fluid ports of two trim valves 152 and 154 included in the clutch control section 158. The clutch and variator pressure control section 98 further includes another conventional fluid pump 100 configured to supply transmission fluid, e.g., conventional transmission oil, to the dual pump pressure regulator valve 190 and, under some operating conditions, to the fluid path 65 to thereby supplement the supply of fluid by the fluid pump 60. In one illustrative embodiment, the fluid pump 100 is a conventional positive-displacement pump that is driven by the drive shaft 16 of the engine 12 via the input shaft 18 of the transmission 14, and is sized and configured to supply pressurized fluid to a conventional transmission lubrication system. In the illustrated embodiment, a fluid inlet of the fluid pump 100 is fluidly coupled to the sump 64 via the fluid passageway 62. A fluid outlet of the pump 100 is fluidly coupled via a fluid cooler/lube fluid passageway 102 to a fluid port of the dual pump pressure regulator valve 190 and to a fluid inlet of the check ball valve 101. Under some operating conditions of the electro-hydraulic control system 24, the dual pump pressure regulator valve 190 directs fluid supplied by the fluid pump 100 to a conventional cooler and lubrication sub-system 160 of the transmission 14 via a fluid path 162. In the illustrated embodiment, the fluid path 162 is fluidly coupled to a fluid inlet of a cooler relief valve 164 and to a fluid inlet of a conventional cooler 166. A fluid outlet of the cooler 166 is fluidly coupled through a fluid filter 168 to a fluid port and end of a gear lubrication regulator valve 170 and to gear lubrication and variator lubrication passageways 172 and 174 respectively. Further details relating to the structure and operation of the clutch and variator pressure control section 98 generally, and to the structure and operation of the dual pump pressure regulator valve 190 in particular, are described in co-pending U.S. patent application Ser. No. 61/423,296, the disclosure of which is incorporated herein by reference in its entirety.

The control main fluid passageway 104 is fluidly coupled to fluid inlets and fluid ports of the control main pressure regulator valve 180 and a conventional control main pressure relief valve 182, to a fluid inlet of a conventional control main pressure accumulator valve 184, to control main inputs of actuators 154, 158, 164, 168, 85 and 87 and to fluid ports of valves 152, 154, 162, 96, 82, 88 and 76. The control main passageway 104 supplies control main fluid to the foregoing actuators and valves.

Referring now to the variator trim control sub-system 56A of the variator control section 56, a variator main fluid passageway 68 is fed, under certain operating conditions as described in detail in co-pending U.S. patent application Ser. No. 61/423,296, by the clutch main fluid passageway 65 via the dual pump pressure regulator valve 190. The variator main fluid passageway 68 is fluidly coupled to a fluid inlet of a variator trim valve 72 and to one end of a variator fault valve 76. The variator trim valve 72 includes an actuator 84 that is electrically connected to the transmission control circuit 30 via a signal path $28_2$. Another fluid inlet of the variator trim valve 72 is fluidly coupled to exhaust, and a fluid outlet of the variator trim valve 72 is fluidly coupled to an end of the variator fault valve 76 opposite the end to which the variator main fluid passageway is coupled, and is also fluidly coupled through a conventional mode damper 118, to a fluid port of the variator pressure multiplex valve 220. Another variator trim valve 70 includes an actuator 74 that is electrically connected to the transmission control circuit 30 via a signal path $28_1$. One fluid inlet of the variator trim valve 70 is fluidly coupled to the clutch main fluid passageway 65. Another fluid inlet of the variator trim valve 70 is fluidly coupled to exhaust, and a fluid outlet of the variator trim valve 70 is fluidly coupled to another fluid port of the variator pressure multiplex valve 220. The actuators 74 and 84 are illustratively conventional electronically actuated solenoids, and the trim valves 70 and 72 are illustratively variable-bleed valves that supply variable-pressure transmission fluid based on control signals produced by the transmission control circuit 30 on the signal paths $28_1$ and $28_2$ respectively.

Under normal operating conditions, the variator pressure multiplex valve 220 routes variator main fluid from the outlet of the mode damper 118 to the variator switching sub-system 56C and routes the fluid outlet of the variator trim valve 70 to an end chamber of the dual pump pressure regulator valve 190 such that under such normal operating conditions the variator trim valve 72 controls the variator switching sub-system 56C and the fluid pressures in the clutch main fluid passageway 65 and in the endload passageway of the variator actuator control sub-system 56B are modulated by the variator trim valve 70. Under other operating conditions, e.g., during cold start and/or certain fault conditions, the variator pressure multiplex valve 220 exhausts one end chamber of the dual pump pressure regulator valve 190 such that the dual pump regulator valve 190 regulates the fluid pressure in the clutch main fluid passageway 65 (and thus the fluid pressures in the other main fluid passageways) to a constant fluid pressure, and the variator pressure multiplex valve 220 further routes fluid from the clutch main fluid passageway 65 directly to the variator switching sub-system 56C such that under such other operating conditions the variator trim valve 70 controls the variator switching sub-system 56C. Further details relating to the structure and operation of the variator trim control sub-system 56A are described hereinafter with respect to FIGS. 4-5.

Referring now to the variator actuator sub-system 56B of the variator control section 56, a fluid path 112 fluidly coupled to the variator switching sub-system 56C defines a variator high-side fluid passageway, S1, and a fluid path 116 also fluidly coupled to the variator switching subsection 56C defines a variator low-side fluid passageway, S2. In the embodiment illustrated in FIG. 3, the variator includes six actuators, $50_1$-$50_6$, e.g., conventional pistons, and the variator high-side fluid passageway 112 is fluidly coupled to the high side of each such actuator $50_1$-$50_6$ via a corresponding conventional damper $122_1$-$122_6$. A conventional check valve 126 is interposed between the variator high-side fluid passageway 112 and a fluid passageway 128. The variator low-side fluid passageway 116 is fluidly coupled to the low side of each actuator $50_1$-$50_6$ via a corresponding conventional damper $136_1$-$136_6$, and another conventional check valve 140 is interposed between the variator low-side fluid passageway 116 and the fluid passageway 128. The fluid passageway 128 is fluidly coupled to an endload relief valve 130, which is further fluidly coupled between the high side and the low side of the actuator $50_6$. Further details relating to one illustrative structure and method of operating the endload relief valve 130 are provided in co-pending U.S. Patent Application Ser. No. 61/287,020, the disclosure of which is incorporated herein by reference in its entirety.

The fluid passageway 128 is further fluidly coupled to another fluid passageway 132, and an endload port or passageway 135 is fluidly coupled to another fluid passageway 134. In the state of the variator multiplex valve 220 illustrated in FIG. 3, i.e., stroked, the fluid passageway 132 is fluidly coupled via the variator pressure multiplex valve 220 to the fluid passageway 134 such that the fluid pressure within the endload port or passageway 135 is supplied by the fluid passageway 128. Generally, the fluid pressure in the endload port or passageway 135 is the pressure load on the variator disks required to keep the variator disks from slipping. The pressure in the fluid passageway 128 under such normal operating conditions is variable, and is controlled by the variator based on the fluid pressures S1 and S2. Under normal operating conditions, such as illustrated in FIG. 3, the variator pressure multiplex valve 220 fluidly couples the endload port or passageway 135 directly to the fluid passageway 128 such that the fluid pressure in the endload fluid passageway 135 is modulated by the variable fluid pressure in the fluid passageway 128. Under other operating conditions, e.g., cold start and certain fault conditions, the variator pressure multiplex valve 220 routes a fluid at a fixed pressure, e.g., clutch main fluid in the clutch main fluid passageway 65, to the endload fluid port or passageway 135 via the fluid passageway 134, as is described in greater detail hereinafter.

A variator fault valve 76 is fluidly coupled between the variator main fluid passageway 68 at one end and the fluid outlet of the variator trim valve 72 at its opposite end. The variator fault valve 76 illustratively includes a spool 142 which is responsive to a difference in pressure between the variator main fluid passageway 68 and the fluid outlet of the variator trim valve 72 to determine whether a variator fault exists. In the embodiment illustrated in FIG. 3, for example, if the fluid pressure in the variator main fluid passageway 68 is sufficiently greater than that in the fluid outlet of the variator trim valve 72, the spool 142 is forced upwardly and thereby fluidly couples the exhaust backfill fluid passageway (EB) 108 to the fluid passageway 144. This is the position of the spool 142 illustrated in FIG. 3. If instead the fluid pressure in the fluid outlet of the variator trim valve 72 is sufficiently greater than that in the variator main fluid passageway 68, the spool 142 is forced downwardly and thereby fluidly couples the control main (COM) fluid passageway 104 to the fluid passageway 144. Illustratively, the variator fault valve 76 is designed to have a specified amount of hysteresis between the two extreme positions of the spool 142, and in one embodiment the hysteresis is approximately 15-20% such that the differential pressure between variator main fluid passageway 68 and the fluid outlet of the variator trim valve 72 must be greater than about 15-20% before the spool 142 changes position. Those skilled in the art will appreciate that this hysteresis value is provided only by way of example and that other hysteresis values, or no hysteresis value, may alternatively be used.

Referring now to the variator switching sub-system 56C of the variator control section 56, a pair of variator control valves 82 and 88 each include an actuator 85 and 95 respectively that is electrically connected to the transmission control circuit 30 via a signal path $28_3$ and $28_4$ respectively. In the illustrated embodiment, the actuators 85 and 95 are illustratively conventional electronically actuated solenoids. The actuators 85 and 95 are responsive to control signals produced by the transmission control circuit 30 on the signal paths $28_3$ and $28_4$ respectively to selectively control the valves 82 and 88 to thereby selectively supply S1 and S2 fluid pressures provided by the variator trim valve 72 under normal operating conditions, or provided by the variator trim valve 70 under other operating conditions, e.g., cold start and certain fault conditions, to the variator actuator sub-system 56B of the variator control section 56. Further details relating to the structure and operation of the variator control valves 82 and 88 are described in co-pending U.S. patent application Ser. No. 61/423,293, the disclosure of which is incorporated herein by reference in its entirety.

Referring now to the clutch control section 58, the clutch main fluid passageway 65 is illustratively fluidly coupled to each of a pair of clutch trim valves 150 and 152 which together define a trim system. The clutch trim valves 150 and 152 each illustratively include an actuator 154 and 158 respectively that is electrically connected to the transmission control circuit 30 via a signal path $28_5$ and $28_6$ respectively. One control fluid inlet of each of the clutch trim valves 150 and 152 is fluidly coupled to the control main fluid passageway 104, and another control fluid inlet of each clutch trim valve 150 and 152 is fluidly coupled to exhaust. In the illustrated embodiment, the actuators 154 and 158 are illustratively conventional electronically actuated solenoids. Fluid outlets of each of the clutch trim valves 150 and 152 are fluidly coupled to fluid inlets of each of a pair of clutch control valves 162 and 96. The clutch trim valves 150 and 152 are each configured to selectively, i.e., under the control of the transmission control circuit 30 via signals produced by the transmission control circuit 30 on the signal paths $28_5$ and $28_6$ respectively, fluidly couple the clutch main fluid passageway 65 to the clutch control valves 162 and 96.

The clutch control valves 162 and 96 each illustratively include an electronic actuator, e.g., an electrically controlled solenoid, 164 and 168 respectively that is electrically connected to the transmission control circuit 30 via a signal path $28_7$ and $28_8$ respectively. One control fluid inlet of each clutch control valve 162 and 96 is fluidly coupled to the control main, COM, fluid passageway 104, and another control fluid inlet is fluidly coupled to exhaust. The clutch control valve 96 is further fluidly coupled directly to the C2 clutch fluid path $25_2$, and clutch main fluid or exhaust backfill is selectively applied to the C2 clutch via the fluid path $25_2$ via various combinations of states of the actuators 154, 158, 164 and 168. The clutch control valve 162 is further fluidly coupled directly to each of the C1 and C3 clutch fluid paths $25_1$ and $25_3$, and clutch main fluid or exhaust backfill is selectively routed through the clutch control valve 162 to the C1 clutch via the fluid passageway $25_1$ or to the C3 clutch via the fluid passageway $25_3$ via various combinations of states of the actuators 154, 158, 164 and 168. The clutches C1-C3 are thus selectively activated, i.e., engaged, and deactivated, i.e., disengaged, based on the operating states of the actuators 154, 158, 164 and 168 of the clutch trim valves 150 and 152 and the clutch control valves 162 and 96 respectively, by selectively routing clutch main fluid and exhaust backpressure through the control valves 162 and 96 to the various clutches C1-C3.

Further details relating to the structure and operation of the clutch control subsection 58 are provided in co-pending U.S. Patent Application Ser. No. 61/287,031, and in co-pending U.S. Patent Application Ser. No. 61/287,038, the disclosures of which are both incorporated herein by reference in their entireties.

In the illustrated embodiment, sensors are operatively positioned relative to the variator fault valve 76, the variator control valve 88, the clutch trim valve 154 and each of the clutch control valves 162 and 96 to enable monitoring of the operating states of each of the valves 76, 88, 154, 162 and 96 and to further monitor certain transmission operating state faults. In one illustrative embodiment, such sensors are provided in the form of conventional pressure switches, although it will be understood that a conventional pressure sensor may be substituted for any one or more of the pressure switches. In the illustrated embodiment, for example, a pressure switch 146 is fluidly coupled to a fluid port of the variator control valve 88, and is electrically connected to the transmission control circuit 30 via a signal path $26_1$. Another pressure switch 148 is fluidly coupled to the fluid port 144 of the variator fault valve 76, and is electrically connected to the transmission control circuit 30 via a signal path $26_2$. Still another pressure switch 184 is fluidly coupled to a fluid port of the clutch control valve 162, and is electrically connected to the transmission control circuit 30 via a signal path $26_3$. Yet another pressure switch 188 is fluidly coupled to a fluid port of the clutch control valve 96, and is electrically connected to the transmission control circuit 30 via a signal path $26_4$. A further pressure switch 186 is fluidly coupled to a fluid port of the clutch trim valve 154, and is electrically connected to the transmission control circuit 30 via a signal path $26_5$.

Signals produced by the pressure switches 146, 148, 184, 188 and 186 are processed by the transmission control circuit 30 to allow monitoring and diagnosis by the transmission control circuit 30 of the states of these pressure switches and thus the operating states of the each of the valves 76, 88, 154, 162 and 96. For example, in the embodiment illustrated in FIG. 3, the pressure switch 148 is configured to produce a signal corresponding to the state, e.g., normal or variator fault, of the variator fault valve 76. If the fluid pressure in the variator main fluid passageway 68 is sufficiently greater than that in the fluid outlet of the variator trim valve 72 such that the spool 142 is forced upwardly and thereby fluidly couples the exhaust backfill fluid passageway (EB) 108 to the fluid passageway 144, as illustrated in FIG. 3, this corresponds to normal operation of the variator in which the pressure switch 148 produces a low or logical "0" signal. If instead the fluid pressure in the fluid outlet of the variator trim valve 72 is sufficiently greater than that in the variator main fluid passageway 68, the spool 142 is forced downwardly (not shown in the FIGS) which causes the spool 142 to fluidly couple the control main (COM) fluid passageway 104 to the fluid passageway 144. This corresponds to a variator fault conditions and the pressure switch 148 under such a variator fault condition switches to a high or logical "1" state. Thus, under normal operating conditions the pressure switch 148 produces a low or "0" signal, and under variator fault conditions the pressure switch 148 produces a high or "1" signal. The memory 32 of the transmission control circuit 30 Illustratively includes instructions stored therein that are executable by the control circuit 30 to process the signal produced by the pressure switch 148 to determine whether the variator is operating normally or whether a variator fault exists.

Further details relating to diagnosis of the signals produced by the pressure switch 146 will be described hereinafter. Further details relating to diagnosis of the signals produced by the pressure switches 184, 186 and 188 are described in co-pending U.S. Patent Application Ser. No. 61/287,031.

Figure 4:
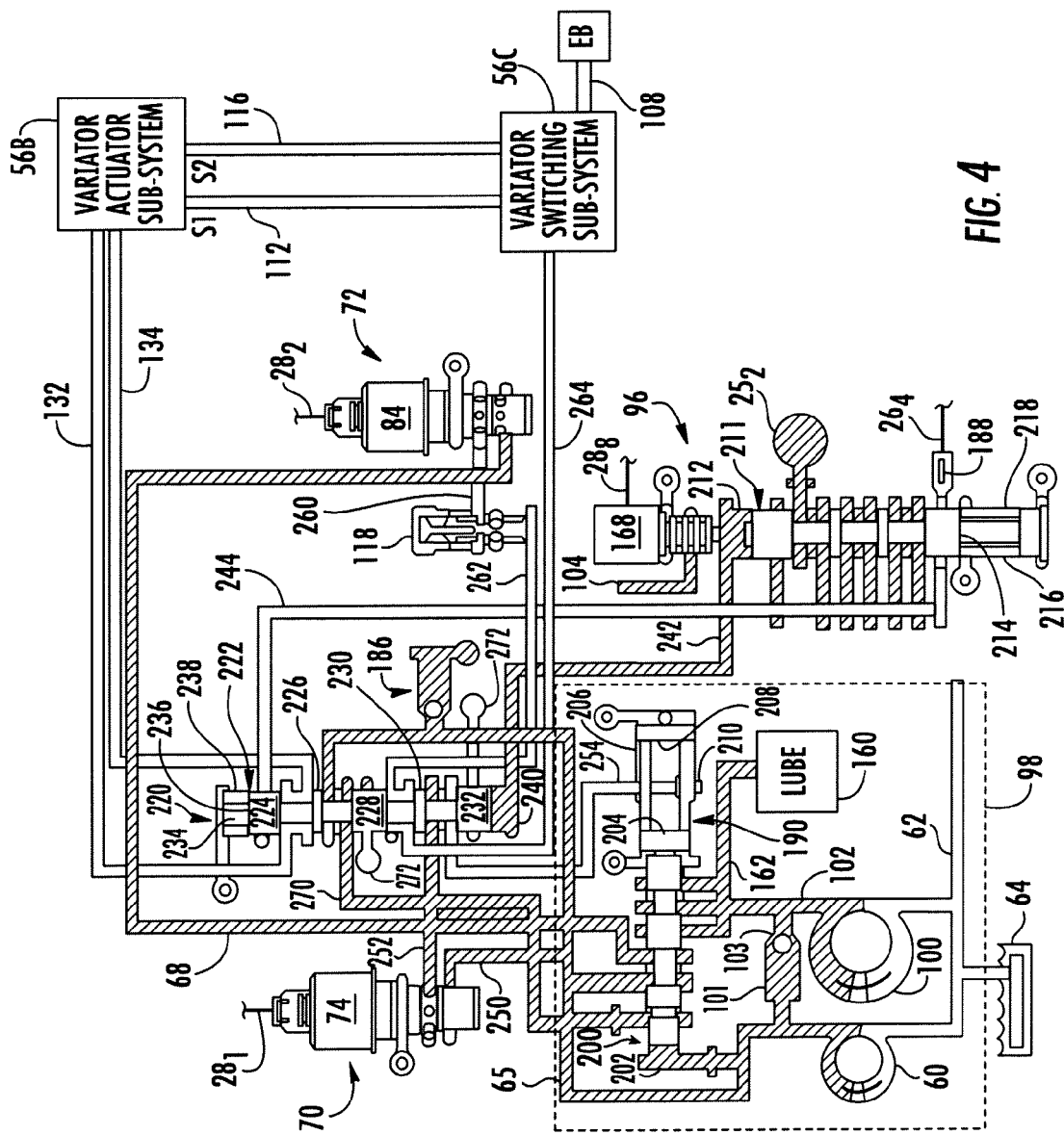
FIG. 4 is a magnified view of the variator trim control sub-system of the electro-hydraulic control system illustrated in FIG. 3 showing the configuration of the variator trim control sub-system under one operating state of the variator multiplex valve.
Figure 5:
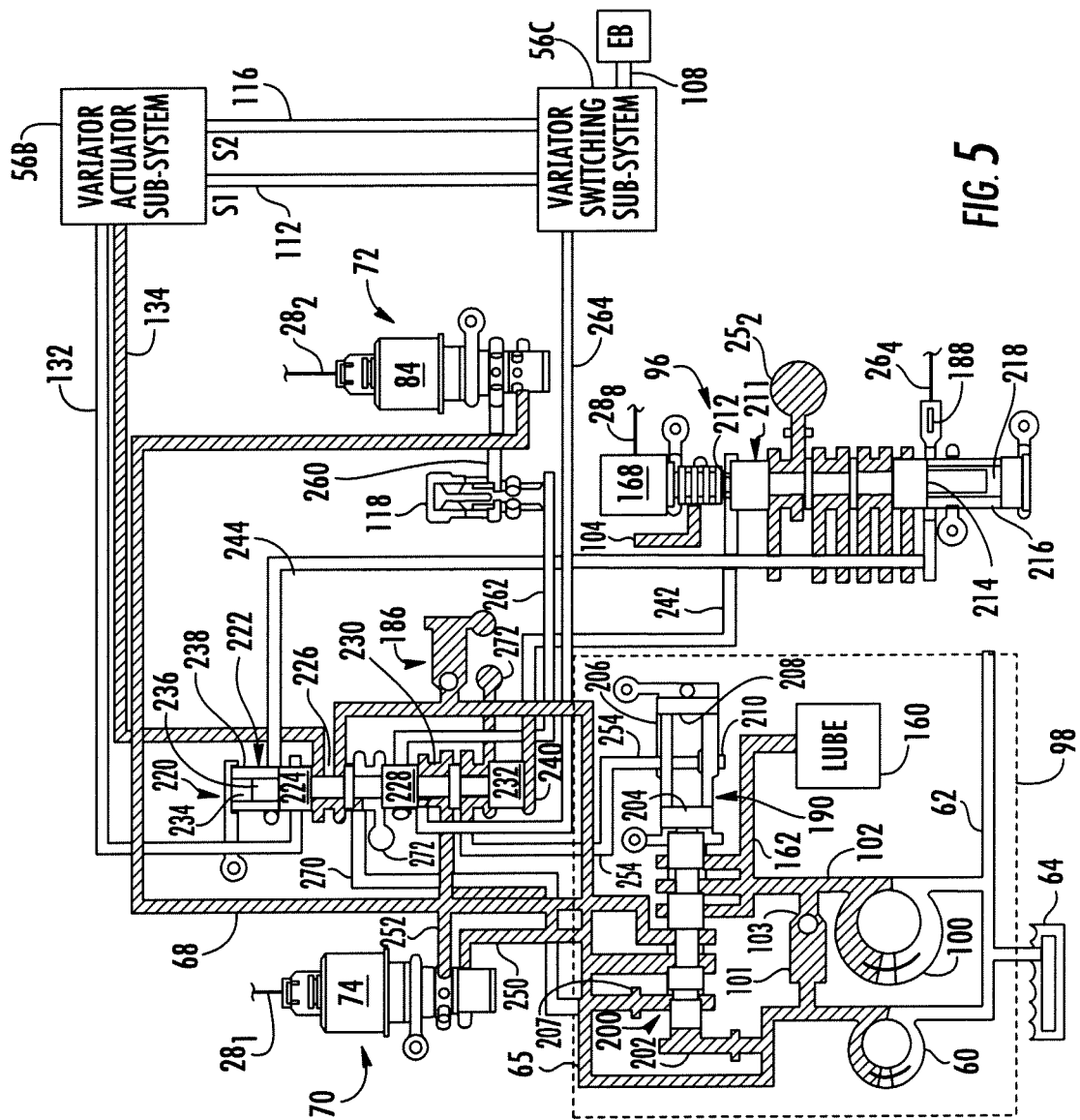
FIG. 5 is a view similar to that of FIG. 4 showing the configuration of the variator trim control sub-system under another operating state of the variator multiplex valve.

Referring now to FIGS. 4-5, further details relating to the structure and operation of the variator trim control subsystem 56A of the variator control section 56 are illustrated. In the embodiment illustrated in FIGS. 4-5, like reference numbers are used to identify like components illustrated in FIG. 3. Referring specifically to the clutch and variator pressure control section 98, the fluid pump 60 is fluidly coupled to one end of the dual pump pressure regulator valve 190 via the clutch main fluid passageway 65, and the fluid pump 100 is fluidly coupled to the dual pump pressure regulator valve 190 via a fluid passageway 102. A check ball valve 101 is positioned between the fluid passageways 65 and 102, and a ball 103 is positioned within the valve 101 which opens when the fluid pressure in the fluid passageway 102 exceeds that in the fluid passageway 65 by at least a predefined pressure value such that fluid in the fluid passageway 102 can then flow from the fluid passageway 102 into the fluid passageway 65 under certain operating conditions. The dual pump pressure regulator valve 190 includes a spool 200 that axially translates under pressure within the valve 190, e.g., within a conventional valve housing (not shown). The spool 200 defines a number of lands consecutively and sequentially positioned along the spool 200 from one end 202 to an opposite end 204. The end of the valve 190 in which the end 202 of the spool 200 translates is fluidly coupled via a conventional flow reducer to the clutch main fluid passageway 65. A spool base 208 is positioned within and at a terminal end of a spring pocket 210, and a conventional valve spring 206 engages and extends between the end 204 of the spool 200 and the spool base 208. The valve spring 206 is compressed and therefore exerts a spring bias or spring force between and against the spool base 208 and the end 204 of the spool 200. Because the position of the spool base 208 is fixed at one end of the spring pocket 210, the spool 200 is under bias of the valve spring 206 in the direction of the spool end 202. The spring pocket 210 of the dual pump pressure regulator valve 190 is further fluidly coupled to a fluid outlet of the variator pressure multiplex valve 220 via a fluid passageway 254. The fluid passageway 162 fluidly connected to the lubrication and cooling subsystem 160 is fluidly coupled to the dual pump pressure regulator valve 190 via two separate fluid passageways.

As described hereinabove, the clutch main fluid passageway 65 is fluidly coupled to a fluid inlet of the variator trim valve 70 via a fluid passageway 250. The variator trim valve 70 is illustratively a conventional variable-bleed valve that receives fluid at one fluid inlet from the clutch main fluid passageway 65, receives exhaust at another fluid inlet, and operates in a conventional manner to supply variable-pressure transmission fluid at its outlet based on a control signal produced by the transmission control circuit 30 on the signal path $28_1$. The control signal on the signal path $28_1$ is received by a conventional solenoid 74 which serves as an actuator of the variator trim valve 70. The fluid outlet of the variator trim valve 70 is fluidly coupled to the variator pressure multiplex valve 220 via the fluid passageway 252. Under normal operating conditions of the transmission 14, such as illustrated and will be described with respect to FIG. 4, the variator pressure multiplex valve 220 fluidly couples the fluid passageway 252 to the fluid passageway 254 such that the variable-pressure transmission fluid produced by the variator trim valve 70 at its fluid outlet is supplied to the spring pocket 210 of the dual pump pressure regulator valve 190. Under such normal operating conditions, the position of the spool 200 within the dual pump pressure regulator valve 190 is defined by the fluid pressure at the end 202 of the spool 200, the fluid pressure at the opposite end 204 of the spool 200, i.e., the fluid pressure within the spring pocket 210, and the biasing force of the valve spring 206. Under certain other predefined operating conditions of the transmission 14, such as illustrated and will be described with respect to FIG. 5, the variator pressure multiplex valve 220 fluidly couples a fixed reference pressure to the fluid passageway 254 such that the fixed reference pressure is supplied to the spring pocket 210 of the dual pump pressure regulator valve 190. In one illustrative embodiment, the fixed reference pressure is exhaust, and the variator pressure multiplex valve 220 therefore fluidly couples the fluid passageway 254 to an exhaust passageway 272, as illustrated in FIG. 5, to exhaust the spring pocket 210 of the dual pump regulator valve 190 under the certain other predefined operating conditions of the transmission 14. In this embodiment, the position of the spool 200 within the dual pump pressure regulator valve 190 under such other predefined operating conditions is defined by the fluid pressure at the end 202 of the spool 200, the area of the face of the end 202 of the spool 200 and the biasing force of the valve spring 206. In alternative embodiments, the fixed reference pressure may be a fixed pressure greater than exhaust, and in such embodiments the position of the spool 200 within the dual pump pressure regulator valve 190 under the other predefined operating conditions is defined by the pressure at the end 202 of the spool 200, the biasing force of the valve spring 206 and the fixed reference pressure within the spring pocket 210. The other predefined operating conditions may include a fault condition associated with the operation of the transmission 14 or sub-system, component or section thereof. Alternatively or additionally, the predefined operating conditions may include a cold start operating condition corresponding to low temperature operation of the transmission 14 such as when starting the power plant 12 and beginning operation in cold weather, e.g., outside ambient temperature below a threshold temperature. Those skilled in the art will recognize one or more additional operating conditions that may define or be included with the other predefined operating conditions, and such one or more additional operating conditions are contemplated by this disclosure. In any case, further details relating to the operation of the variator pressure control section 98 generally and of the dual pump regulator valve 190 specifically during normal and the one or more other predefined operating conditions and are described in co-pending U.S. patent application Ser. No. 61/423,296.

The variator main fluid passageway 68 is fluidly coupled between the dual pump pressure regulator valve 190 and the variator trim valve 72. The variator trim valve 72 is illustratively a conventional variable-bleed valve that receives fluid at one fluid inlet from the variator main fluid passageway 68, receives exhaust at another fluid inlet, and operates in a conventional manner to supply variable-pressure transmission fluid at its outlet based on a control signal produced by the transmission control circuit 30 on the signal path $28_2$. The control signal on the signal path $28_2$ is received by a conventional solenoid 84 which serves as an actuator of the variator trim valve 72. The fluid outlet of the variator trim valve 72 is fluidly coupled to a fluid inlet of the mode damper 118 via a fluid passageway 260, and the fluid outlet of the mode damper 118 is fluidly coupled to the variator pressure multiplex valve 220 via the fluid passageway 262. Under normal operating conditions of the transmission 14, such as illustrated and will be described with respect to FIG. 4, the variator pressure multiplex valve 220 fluidly couples the fluid passageway 262 to a fluid passageway 264 that is fluidly coupled to the variator switching sub-system 56C such that the variable-pressure transmission fluid produced by the variator trim valve 72 at its fluid outlet is supplied to the variator switching sub-system 56C. Under the other predefined operating conditions, such as illustrated and will be described with respect to FIG. 5, the variator pressure multiplex valve 220 fluidly couples the fluid passageway 252 to the fluid passageway 264 such that the variable-pressure transmission fluid produced by the variator trim valve 70 at its fluid outlet is supplied to the variator switching sub-system 56C.

The variator switching sub-system 56C, illustrated in block diagram form in FIGS. 4 and 5, receives pressurized fluid from the variator trim valve 70 or the variator trim valve 72 via the fluid passageway 264. The variator switching sub-system 56C also receives a lower pressure fluid, and in the illustrated embodiment the variator switching sub-system 56C is fluidly coupled to the exhaust backfill (EB) fluid path 108, such that the lower pressure fluid is illustratively exhaust or ambient pressure. The variator switching sub-system 56C is fluidly coupled to the variator actuator sub-system 56B, which is also illustrated in block diagram form in FIGS. 4 and 5, via fluid passageways 112 and 116. As described hereinabove, the fluid passageway 112 carries the "high side" fluid, S1, supplied to one side, i.e., the high side, of the piston actuators $50_1$-$50_6$, and the fluid passageway 116 carries the "low side" fluid, S2, supplied to the opposite side, i.e., the low side, of the piston actuators $50_1$-$50_6$. As described in detail in co-pending U.S. patent application Ser. No. 61/423,293, the variator switching sub-system 56C selectively supplies the higher pressure fluid in the fluid passageway 264 and the lower pressure fluid, e.g., exhaust backfill, to one or the other of the S1 and S2 fluid passageways 112 and 116 to thereby control operation of the variator actuator sub-system 56B. Those skilled in the art will recognize that other low pressure fluids may be supplied to the variator switching sub-system 56C in place of exhaust backfill 108, and any such other low pressure fluids are contemplated by this disclosure. In any case, during normal operating conditions, as illustrated in FIG. 4, the variator multiplex valve 220 thus directs the high or higher pressure fluid supplied by the variator trim valve 72 to the variator switching sub-system 56 via the fluid passageway 264, and during the other predefined operating conditions, as illustrated in FIG. 5, the variator multiplex valve 220 directs the high or higher pressure fluid supplied by the variator trim valve 70 to the variator switching sub-system 56C. The low or lower pressure fluid supplied to the variator switching sub-system 56C is illustratively exhaust backfill 108 under both normal operating conditions and the other one or more predefined operating conditions. The variator actuator sub-system 56B is responsive to the high and low side fluids S1 and S2 to control torque produced by the variator as described hereinabove.

The variator multiplex valve 220 illustratively includes a spool 222 which sequentially defines a number of lands 224, 226, 228, 230 and 232 thereon between one end 236 and an opposite end 240 thereof. The end 236 resides in a spring pocket 234 of the valve 220 in which a valve spring 238 resides and exerts a biasing force on the end 236 of the spool 222 to thereby bias the spool 222 in the direction of the end 240 of the spool 222. The spring pocket 234 is exhausted at all times. The end 240 of the spool 222 is fluidly coupled to the outlet of a solenoid actuator 168 of the clutch control valve 96 via a fluid passageway 242, and the spring pocket 234 of the valve 220 is fluidly coupled to a spring pocket 218 of the clutch control valve 96 via a fluid passageway 244. The clutch control valve 96 likewise includes a spool 211 sequentially defining a number of lands thereon between one end 212 fluidly coupled to the fluid outlet of the actuator 168 and an opposite end 214 extending into the spring pocket 218. A valve spring 216 is positioned in the spring pocket 218 of the clutch control valve 96, and the valve spring 216 exerts a biasing force against the end 214 of the spool 211 in the direction of the end 212 of the spool 211. One fluid inlet of the actuator 168 receives control main fluid from the control main fluid passageway 104 and another fluid inlet of the actuator 168 is fluidly coupled to exhaust, and the fluid outlet is fluidly coupled to the end 212 of the spool 211. The clutch control valve 96 is illustratively a conventional on-off valve that operates in a conventional manner based on control signals produced by the transmission control circuit 30 on the signal path 28$_8$ and received by the solenoid actuator 168 to stroke and destroke the valve 96.

The memory 32 of the control circuit 30 has instructions stored therein that are executable by the control circuit 30 to control operation of the variator trim valves 70 and 72 and operation of the clutch control valve 96. During normal operation, as illustrated in FIG. 4, the control circuit 30 illustratively controls the actuator 168 to stroke the clutch control valve 96 by supplying the control main fluid in the fluid passageway 104 to the end 212 of the spool 211. The spring pocket 218 is exhausted at all times, and the pressure of the control main fluid in the fluid passageway 104 is controlled to be sufficient to overcome the biasing force of the valve spring 216 when the clutch control valve 96 is stroked such that, when stroked, the spool 211 is positioned away from the fluid outlet of the actuator 168 as illustrated in FIG. 4. In this position, the fluid passageway 242 receives the control main fluid in the fluid passageway 104, which is applied to the end 240 of the spool 222 of the variator multiplex valve 220. The spring pocket 234 of the variator multiplex valve 220 is exhausted, and the spool 222 is forced under pressure of the control main fluid against the valve spring 238 such that the valve spring 238 compresses and the end 240 of the spool 222 moves away from the fluid passageway 242 as illustrated in FIG. 4. The position of the spool 222 illustrated in FIG. 4 represents the stroked state of the variator multiplex valve 220, which occurs when the clutch control valve 96 is also stroked. As described hereinabove, the valves 96 and 220 are stroked as illustrated in FIG. 4 under normal operating conditions of the transmission 14.

During the one or more other predefined operating conditions of the transmission 14, as illustrated in FIG. 5, the control circuit 30 illustratively controls the actuator 168 to destroke the clutch control valve 96 by supplying exhaust to the end 212 of the spool 211. Because the spring pocket 218 is also exhausted the biasing force of the valve spring 216 forces the spool 211 upwardly such that, when destroked, the end 212 of the spool 211 is positioned adjacent to the fluid outlet of the actuator 168 as illustrated in FIG. 5. In this position, the fluid passageway 242 is exhausted, which exhausts the end 240 of the spool 222 of the variator multiplex valve 220. The spring pocket 234 of the variator multiplex valve 220 is also exhausted, and the spool 222 is thus forced downwardly under the biasing force of the valve spring 238 such that the end 240 of the spool 222 is positioned adjacent to the fluid passageway 242 as illustrated in FIG. 5. The position of the spool 222 illustrated in FIG. 5 represents the destroked state of the variator multiplex valve 220, which occurs when the clutch control valve 96 is also destroked. As described hereinabove, the valves 96 and 220 are destroked as illustrated in FIG. 5 under the one or more other predefined operating conditions of the transmission 14, e.g., fault conditions and/or cold start conditions.

It will be understood that while the variator multiplex valve 220 is illustrated in FIGS. 3-5 as being plumbed to mimic the operating state, i.e., stroked or destroked, of the clutch control valve 96, the variator multiplex valve 220 may alternatively be plumbed to assume the opposite of the operating state of the clutch control valve 96.

The clutch main fluid passageway 65 is further fluidly coupled to the variator multiplex valve 220 directly and via a fluid passageway 270. The fluid passageway 132 that is fluidly coupled to the fluid passageway 128 of the variator actuator sub-system 56B (see FIG. 3), and the fluid passageway 134 that is fluidly coupled to the endload port or passageway 135 of the variator actuator sub-system 56B (FIG. 3) are both fluidly coupled to the variator multiplex valve 220.

Under normal operating conditions, as illustrated in FIG. 4, the variator pressure multiplex valve 220 is stroked because the clutch control valve 96 is stroked, and the variator main fluid supplied at the outlet of the mode damper 118 is routed by the variator pressure multiplex valve 220 between the two lands 228 and 230 to the variator switching sub-system 56C, and the fluid passageway 252 fluidly coupled to the fluid outlet of the variator trim valve 70 is routed by the variator pressure multiplex valve 220 between the two lands 230 and 232 to the spring pocket 210 of the dual pump pressure regulator valve 190. Under such normal operating conditions the variator trim valve 72 thus supplies the high pressure fluid to the variator switching sub-system 56C, and the variator trim valve 70 supplies modulated, i.e., variable, fluid pressure to the spring pocket 210 of the dual pressure regulator valve 190. The variator switching sub-system 56C selectively applies the high pressure fluid supplied by the variator trim valve 72 to one of the S1 and S2 fluid passageways 112 and 116, and applies the low pressure fluid supplied by the fluid passageway 108 to the other of the S1 and S2 fluid passageways 112 and 116 under such normal operating conditions as described in greater detail in co-pending U.S. patent application Ser. No. 61/423,293. The dual pressure regulator valve 190 is responsive to the modulated fluid pressure supplied by the fluid outlet of the variator trim valve 70 to the spring pocket 210 of the valve 190 to regulate the pressure of fluid in the clutch main fluid passageway 65 as described in greater detail hereinabove and in co-pending U.S. patent application Ser. No. 61/423,296. Further under the normal operating conditions, the variator trim valve 220 fluidly couples the clutch main fluid passageways 65 and 270 between the lands 226 and 228 of the spool 222, and further couples the fluid passageways 132 and 134 between the lands 224 and 226 of the spool 222. Under the normal operating conditions, the variator multiplex valve 220 thus fluidly couples the endload fluid passageway 135 to the variable pressure fluid passageway 128 of the variator such that fluid pressure in the endload fluid passageway 135 is variably controlled by the variator.

Under other one or more other predefined operating conditions, as illustrated in FIG. 5, the variator pressure multiplex valve 220 is destroked because the clutch control valve 96 is destroked, and the variator main fluid supplied at the outlet of the mode damper 118 is blocked by the land 228 of the spool 222 of the variator pressure multiplex valve 220, and the fluid passageway 252 fluidly coupled to the outlet of the variator trim valve 70 is routed by the variator pressure multiplex valve 220 between the two lands 228 and 230 to the variator switching sub-system 56C. Under such one or more other predefined operating conditions, the variator trim valve 70 thus supplies the high pressure fluid to the variator switching sub-system 56C, and the fluid outlet of the variator trim valve 72 is blocked by the variator multiplex valve 220. The variator switching sub-system 56C selectively applies the high pressure fluid supplied by the variator trim valve 70 to one of the S1 and S2 fluid passageways 112 and 116, and applies the low pressure fluid supplied by the fluid passageway 108 to the other of the S1 and S2 fluid passageways 112 and 116 under such one or more predefined operating conditions as described in greater detail in co-pending U.S. patent application Ser. No. 61/423,293. The variator multiplex valve 220 further routes the exhaust fluid passageway 272 to the spring pocket 210 of the dual pump pressure regulator valve 190 under the one or more predefined operating conditions such that the spring pocket 210 of the valve 190 received exhaust, i.e., ambient pressure. The dual pressure regulator valve 190 is responsive to the fixed reference fluid pressure (e.g., exhaust) supplied by the variator multiplex valve 220 to the spring pocket 210 of the valve 190 to regulate the pressure of fluid in the clutch main fluid passageway 65 to a fixed fluid pressure as described in greater detail hereinabove and in co-pending U.S. patent application Ser. No. 61/423,296.

Further under the one or more predefined operating conditions, the variator multiplex valve 220 fluidly couples the fluid passageway 270 to the exhaust passageway 272 between the lands 226 and 228 of the spool 222, and fluidly couples the clutch main fluid passageway 65 to the fluid passageway 134 between the lands 224 and 226 of the spool 222 while blocking the fluid passageway 132 with the land 224. Under the one or more predefined operating conditions of the transmission 14, the variator multiplex valve 220 thus fluidly couples the endload fluid passageway 135 to the clutch main fluid passageway 65 such that fluid pressure in the endload fluid passageway 135 is controlled to the fixed pressure in the clutch main fluid passageway 65. As described hereinabove, the one or more predefined operating conditions may be or include at least one of a certain one or more fault conditions and a cold start condition.

It will be understood that while the variator multiplex valve 220 is illustrated in FIGS. 3-5 as being plumbed such that higher pressure fluid is supplied by the variator trim valve 72 to the variator switching sub-system 56C when the variator multiplex valve 220 is stroked and the higher pressure fluid is supplied by the variator trim valve 70 to the variator switching sub-system 56C when the variator multiplex valve 220 is destroked, the variator multiplex valve 220 may alternatively be plumbed such that higher pressure fluid is supplied by the variator trim valve 72 to the variator switching sub-system 56C when the variator multiplex valve 220 is destroked and the higher pressure fluid is supplied by the variator trim valve 70 to the variator switching sub-system 56C when the variator multiplex valve 220 is stroked.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

The invention claimed is:

1. A transmission control circuit for a transmission including a variator and an electro-hydraulic control, the transmission control circuit including memory having instructions stored therein that, when executed by the transmission control circuit, cause the transmission control circuit to:
control a variator trim control sub-system of the electro-hydraulic control,
control a variator actuator sub-system of the electro-hydraulic control, and
control a variator switching sub-system of the electro-hydraulic control,
wherein to control the variator switching sub-system comprises to (i) supply a first fluid supplied by a first trim valve to the variator switching sub-system during at least one predefined operating condition of the transmission, and (ii) supply a second fluid supplied by a second trim valve to the variator switching sub-system during operating conditions other than the at least one predefined operating condition.

2. The transmission control circuit of claim 1, wherein the first fluid is a variable pressure fluid.

3. The transmission control circuit of claim 2, wherein the first fluid is derived from a main fluid, and wherein to control the variator switching sub-system comprises to cause the transmission control circuit to regulate pressure of the main fluid to a fixed pressure based on a fixed reference pressure during the at least one predefined operating condition.

4. The transmission control circuit of claim 3, wherein the fixed reference pressure is ambient pressure.

5. The transmission control circuit of claim 1, wherein the second fluid is a variable pressure fluid.

6. The transmission control circuit of claim 5, wherein the second fluid is derived from a main fluid, and wherein to control the variator switching sub-system comprises to cause the transmission control circuit to modulate fluid pressure of the main fluid based on the first fluid supplied by the first trim valve during operating conditions other than the at least one predefined operating condition.

7. The transmission control circuit of claim 1, wherein (i) the variator has at least one roller positioned between a first toroidal disk coupled to an input of the transmission and a second toroidal disk coupled to an output of the transmission, (ii) the variator has an endload fluid passageway defining therein an endload pressure corresponding to a pressure load on the first and second toroidal disks required to keep the first and second toroidal disks from slipping, and (iii) to control the variator switching sub-system comprises to supply a fixed pressure fluid to the endload fluid passageway during the at least one predefined operating condition.

8. The transmission control circuit of claim 1, wherein (i) the variator has at least one roller positioned between a first toroidal disk coupled to an input of the transmission and a second toroidal disk coupled to an output of the transmission, (ii) the variator has an endload fluid passageway defining therein an endload pressure corresponding to a pressure load on the first and second toroidal disks required to keep the first and second toroidal disks from slipping, and (iii) to control the variator switching sub-system comprises to fluidly couple the endload fluid passageway to a variable pressure fluid passageway of the variator during operating conditions other than the at least one predefined operating condition such that fluid pressure in the endload fluid passageway is variably controlled by the variator during operating conditions other than the at least one predefined operating condition.

9. The transmission control circuit of claim 1, wherein the at least one predefined operating condition comprises at least one of a fault condition associated with the transmission and a cold start condition.

10. The transmission control circuit of claim 1, wherein a multiplex valve of the transmission supplies (i) the first fluid to the variator switching sub-system during the at least one predefined operating condition and (ii) the second fluid to the variator switching sub-system during operating conditions other than the at least one predefined operating condition.

11. The transmission control circuit of claim 10, wherein the transmission control circuit is configured to produce a first control signal to cause the first trim valve to supply the first fluid to the multiplex valve, and wherein the transmission control circuit is configured to produce a second signal to cause the multiplex valve to supply the first fluid to the variator switching sub-system during the at least one predefined operating condition.

12. The transmission control circuit of claim 11, wherein the transmission control circuit is configured to produce a third control signal to cause the second trim valve to supply the second fluid to the multiplex valve, and wherein the transmission control circuit is configured to produce a fourth signal to cause the multiplex valve to supply the second fluid to the variator switching sub-system during operating conditions other than the at least one predefined operating condition.

13. A variator control circuit for an electro-hydraulic control of a variator, the variator control circuit including memory having instructions stored therein that when executed by the variator control circuit, cause the variator control circuit to:
supply a first fluid supplied by a first trim valve to a variator switching sub-system of the electro-hydraulic control during at least one predefined operating condition of a transmission including the variator so that the first trim valve controls the variator switching sub-system during the at least one predefined operating condition, and
supply a second fluid supplied by a second trim valve to the variator switching sub-system during operating conditions of the transmission other than the at least one predefined operating condition so that the second trim valve controls the variator switching sub-system during operating conditions other than the at least one predefined operating condition.

14. The variator control circuit of claim 13, wherein the at least one predefined operating condition comprises one of a fault condition associated with the transmission and a cold start condition.

15. The variator control circuit of claim 13, wherein one of the first fluid and the second fluid is a variable pressure fluid.

16. The variator control circuit of claim 13, wherein (i) the variator has at least one roller positioned between a first toroidal disk coupled to an input of the transmission and a second toroidal disk coupled to an output of the transmission, (ii) the variator has an endload fluid passageway defining therein an endload pressure corresponding to a pressure load on the first and second toroidal disks required to keep the first and second toroidal disks from slipping, and (iii) to supply the first fluid to the variator switching sub-system comprises to supply a fixed pressure fluid to the endload fluid passageway during the at least one predefined operating condition.

17. The variator control circuit of claim 13, wherein (i) the variator has at least one roller positioned between a first toroidal disk coupled to an input of the transmission and a second toroidal disk coupled to an output of the transmission, (ii) the variator has an endload fluid passageway defining therein an endload pressure corresponding to a pressure load on the first and second toroidal disks required to keep the first and second toroidal disks from slipping, and (iii) to supply the second fluid to the variator switching sub-system comprises to fluidly couple the endload fluid passageway to a variable pressure fluid passageway of the variator during operating conditions other than the at least one predefined operating condition such that fluid pressure in the endload fluid passageway is variably controlled by the variator during operating conditions other than the at least one predefined operating condition.

18. The variator control circuit of claim 13, wherein to supply the first fluid supplied by the first trim valve to the variator switching sub-system during the at least one predefined operating condition comprises to stroke a multiplex valve of the transmission so that the multiplex valve supplies the first fluid from the first trim valve to the variator switching sub-system during the at least one predefined operating condition of the transmission.

19. The variator control circuit of claim 18, wherein to supply the second fluid supplied by the second trim valve to the variator switching sub-system during operating conditions other than the at least one predefined operating condition comprises to destroke the multiplex valve so that the multiplex valve supplies the second fluid from the second trim valve to the variator switching sub-system during operating conditions other than the at least one predefined operating condition.

* * * * *